United States Patent
Aoshima et al.

(10) Patent No.: US 12,554,968 B2
(45) Date of Patent: Feb. 17, 2026

(54) CHECKING DEVICE, CHECKING METHOD, AND CHECKING PROGRAM

(71) Applicant: NTT, Inc., Tokyo (JP)

(72) Inventors: Tatsuhiro Aoshima, Tokyo (JP); Toshinori Usui, Tokyo (JP); Yuhei Kawakoya, Tokyo (JP); Makoto Iwamura, Tokyo (JP); Jun Miyoshi, Tokyo (JP)

(73) Assignee: NTT, Inc., Tokyo (JP)

( * ) Notice: Subject to any disclaimer, the term of this patent is extended or adjusted under 35 U.S.C. 154(b) by 873 days.

(21) Appl. No.: 17/783,608

(22) PCT Filed: Dec. 11, 2019

(86) PCT No.: PCT/JP2019/048490
§ 371 (c)(1),
(2) Date: Jun. 8, 2022

(87) PCT Pub. No.: WO2021/117162
PCT Pub. Date: Jun. 17, 2021

(65) Prior Publication Data
US 2023/0016772 A1    Jan. 19, 2023

(51) Int. Cl.
*G06N 3/044* (2023.01)
*G06N 3/084* (2023.01)

(52) U.S. Cl.
CPC ............. *G06N 3/044* (2023.01); *G06N 3/084* (2013.01)

(58) Field of Classification Search
CPC .................. G06N 3/044; G06N 3/084
See application file for complete search history.

(56) References Cited

FOREIGN PATENT DOCUMENTS

JP    2018195314 A * 12/2018 ............. G06N 3/044

OTHER PUBLICATIONS

Charisopoulos et al. "A Tropical Approach to Neural Networks with Piecewise Linear Activations", arXiv:1805.08749v2 [stat.ML] Jan. 30, 2019, pp. 18.*

Yordanov, Boyan et al., "Temporal Logic Control of Discrete-Time Piecewise Affine Systems", IEEE [online], Proceedings of IEEE Transactions on Automatic Control, vol. 57, issue 6, Dec. 14, 2011 [retrieval date Jul. 15, 2020], Internet: <URL:https://ieeexplore.ieee.org/document/6104370> pp. 1491-1504.

* cited by examiner

*Primary Examiner* — Li Wu Chang (57) ABSTRACT

A calculating unit calculates a semantics set relating to an entirety of state of a recursive neural network satisfying a specification. A determining unit determines whether or not the recursive neural network that is an object of checking satisfies the specification, on the basis of the semantics set and an initial state of the recursive neural network that is the object of checking.

7 Claims, 7 Drawing Sheets

CHECKING DEVICE, CHECKING METHOD, AND CHECKING PROGRAM

CROSS-REFERENCE TO RELATED APPLICATIONS

This application is a U.S. National Stage Application filed under 35 U.S.C. § 371 claiming priority to International Patent Application No. PCT/JP2019/048490, filed on 11 Dec. 2019, the disclosure of which is hereby incorporated herein by reference in its entirety.

TECHNICAL FIELD

The present invention relates to a checking device, a checking method, and a checking program.

BACKGROUND ART

There conventionally is known a technique for checking the behavior of systems controlled by machine learning models. For example, there is a method of checking whether or not a finite state transition system or a continuous state transition system expressed by a piecewise linear function satisfies a specification described by Linear Temporal Logic (e.g., see NPL 1).

CITATION LIST

Non Patent Literature

Non-Patent Literature 1: Yordanov, B., et al 2011. "Temporal Logic Control of Discrete Time Piecewise Affine Systems." IEEE Transactions on Automatic Control, vol. 57, no. 6, pp. 1491-1504.

SUMMARY OF THE INVENTION

Technical Problem

However, there is a problem in conventional technology in that there are cases in which checking the behavior of a system controlled by a recursive neural network is difficult. First, a recursive neural network defined as a synthesis of linear transformation and a sigmoid function is a nonlinear function, and accordingly conventional technology cannot be applied. There also are cases in which a specification in which certain periods in which a particular function can be satisfied and certain periods in which the particular function must not be satisfied alternate is demanded of a system controlled by a recursive neural network. However, such a specification cannot be described using Linear Temporal Logic, and accordingly cannot be checked with conventional technology.

Means for Solving the Problem

In order to solve the above-described problems, and achieve the object, a checking device includes a calculating unit that calculates a set relating to an entirety of state of a recursive neural network satisfying a specification, and a determining unit that determines whether or not the recursive neural network that is an object of checking satisfies the specification, on the basis of the set and an initial state of the recursive neural network that is the object of checking.

Effects of the Invention

According to the present invention, behavior of a system controlled by a recursive neural network can be checked.

DESCRIPTION OF EMBODIMENTS

An embodiment of a checking device, a checking method, and a checking program according to the present application will be described in detail below, with reference to the figures. Note that the present invention is not limited by the embodiment described below.

Here, the checking device according to the present embodiment is a device for checking whether or not a recursive neural network satisfies a specification. Now, sequential data is input to the recursive neural network. For example, in a case of inputting time-series data to the recursive neural network, the state of the recursive neural network changes as the time of the input data advances. Accordingly, the checking device according to the present embodiment checks whether or not the recursive neural network that is the object of checking satisfies a specification, assuming an entirety of state of satisfying the specification using a modal logic technique, for example.

Figure 2:
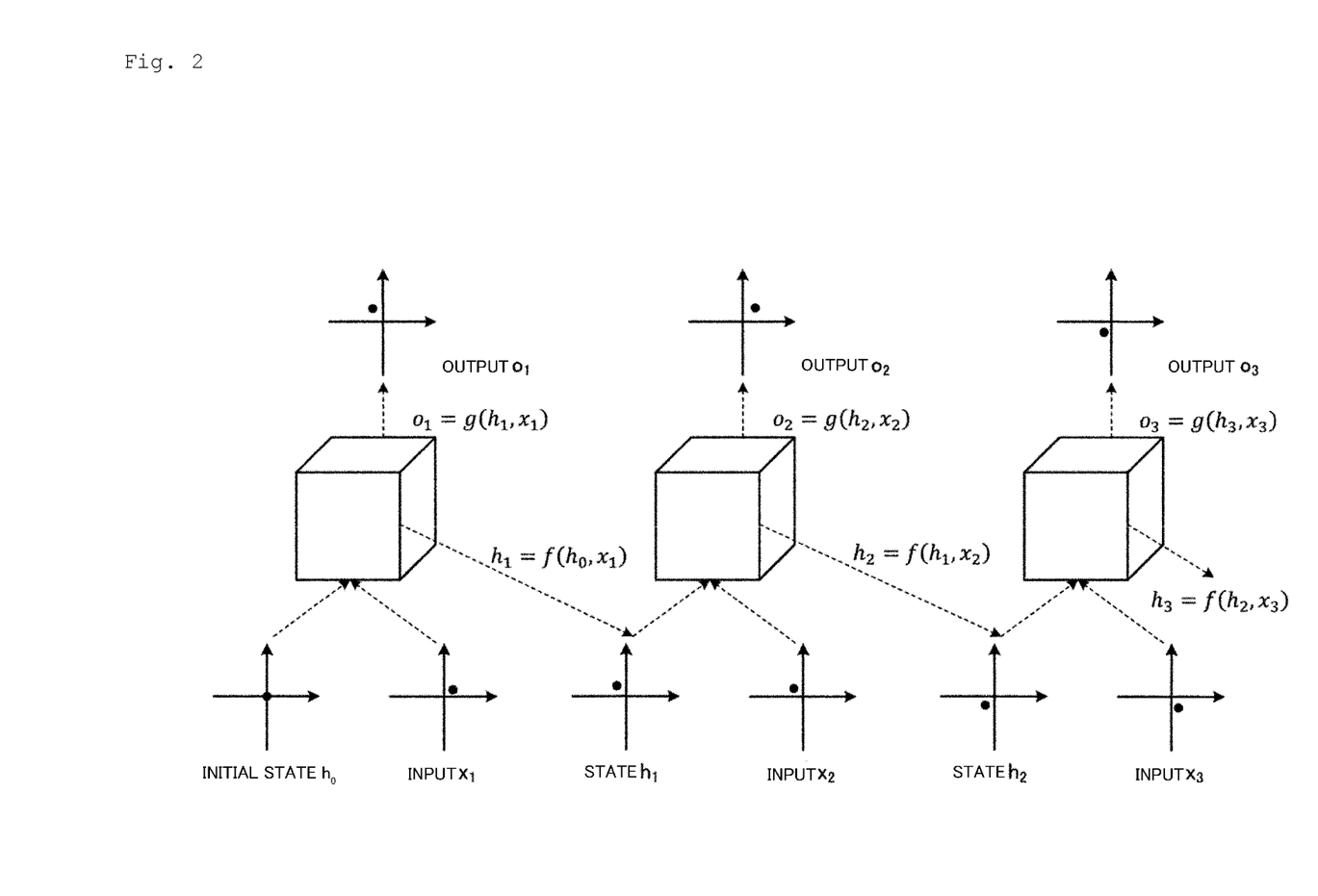
FIG. 2 is an explanatory diagram describing operations of a recursive neural network.

Operations of a general recursive neural network will be described here with reference to FIG. 2. FIG. 2 is an explanatory diagram describing operations of a recursive neural network. Note that description will be made in the present embodiment in which time-series data is input to the recursive neural network. The recursive neural network calculates, on the basis of the state and input at each time, the state and output at the next time, as illustrated in FIG. 2. Also, in calculation of the general recursive neural network, states, input values, and output values are expressed as points on a predetermined plane, as illustrated in FIG. 2. Also, the recursive neural network is expressed by functions f and g.

The suffixes of the characters in FIG. 2 represent time. For example, the recursive neural network first, from an initial state $h_0$ and input $x_1$, calculates a state $h_1 = f(h_0, x_1)$ at time $t=1$. Further, the recursive neural network calculates, from state $h_1$ and input $x_1$, output $o_1 = g(h_1, x_1)$ at time $t=1$. Further, the recursive neural network calculates, from state $h_1$ and input $x_2$, state $h_2 = f(h_1, x_2)$ at time $t=2$. Further, the recursive neural network calculates, from state $h_2$ and input $x_2$, output $o_2 = g(h_2, x_2)$ at time $t=2$. Thus, the recursive neural network recursively calculates states and outputs.

Configuration of First Embodiment

The configuration of the checking device according to the first embodiment will be described with reference to FIG. 1.

Figure 1:
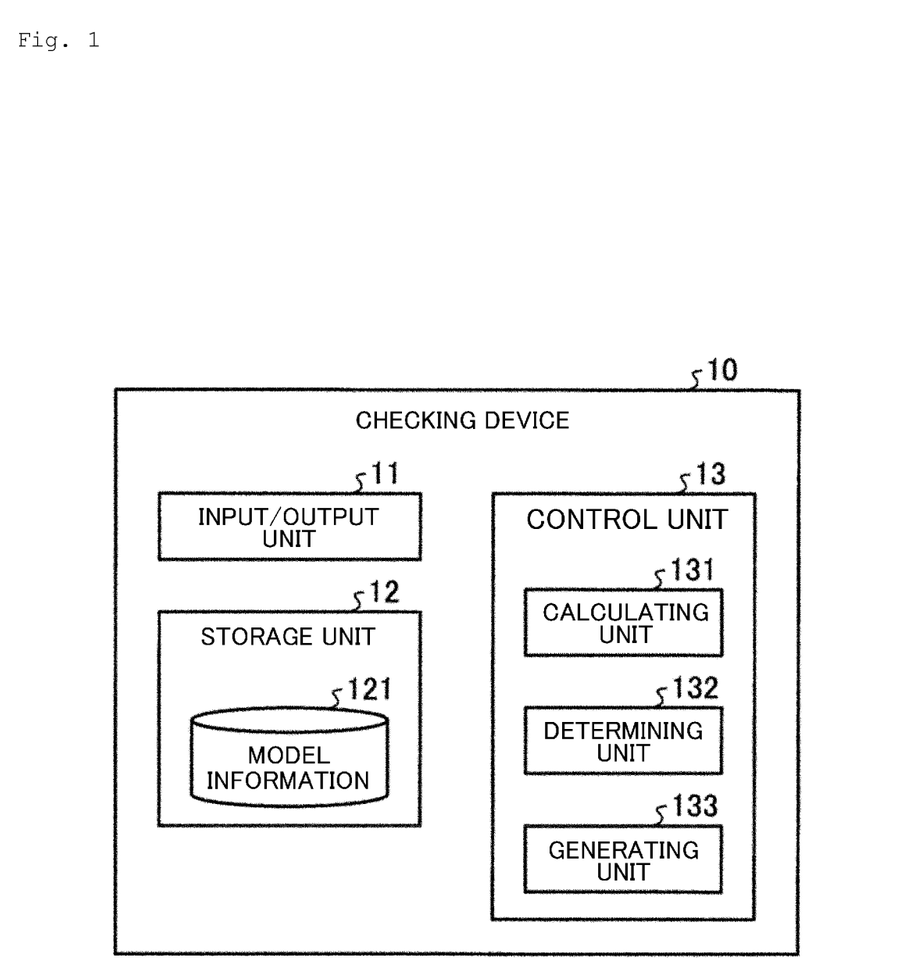
FIG. 1 is a diagram illustrating a configuration example of a checking device according to a first embodiment.

FIG. 1 is a diagram illustrating a configuration example of the checking device according to the first embodiment. As illustrated in FIG. 1, the checking device 10 includes an input/output unit 11, a storage unit 12, and a control unit 13.

The input/output unit 11 is an interface for performing input/output of data. For example, the input/output unit 11 may be a communication interface such as an NIC (Network Interface Card) or the like to perform data communication with another device over a network. The input/output unit 11 may also include an input device such as a mouse, a keyboard, or the like, and an output device such as a display or the like.

The storage unit 12 is a storage device such as an HDD (Hard Disk Drive), an SSD (Solid State Drive), an optical disc, or the like. Note that the storage unit 12 may be data-rewritable semiconductor memory such as RAM (Random Access Memory), flash memory, NVSRAM (Non Volatile Static Random Access Memory), or the like. The storage unit 12 stores an OS (Operating System) and various types of programs executed by the checking device 10. The storage unit 12 also stores model information 121.

The model information 121 is information for constructing the recursive neural network. The model information 121 may be the parameters such as the weights, biases, and so forth of the nodes of the recursive neural network, for example.

The control unit 13 controls the entire checking device 10. The control unit 13 is, for example, an electronic circuit such as a CPU (Central Processing Unit), an MPU (Micro Processing Unit), or the like, or an integrated circuit such as an ASIC (Application Specific Integrated Circuit), a FPGA (Field Programmable Gate Array), or the like. The control unit 13 also has internal memory for storing programs and control data defining various types of processing procedures, and executes processing using the internal memory. The control unit 13 also functions as various types of processing units by running various types of programs. For example, the control unit 13 has a calculating unit 131, a determining unit 132, and a generating unit 133.

The calculating unit 131 calculates sets relating to the entirety of state of the recursive neural network satisfying a specification. For example, the calculating unit 131 calculates a semantics set for negation of the entirety of state of the recursive neural network satisfying a specification.

In doing so, the calculating unit 131 calculates a semantics set with the specification as a universal modal µ-calculus expression. A universal modal µ-calculus expression is a modal µ-calculus expression that includes only □, which is an operator indicating necessity in modal logic. This guarantees that if a counterexample of the specification exists, there is only one.

A semantics set for negation of the entirety of state of the recursive neural network satisfying the specification can be said to be a semantics set of the state of the recursive neural network not satisfying the specification. That is to say, the calculating unit 131 calculates a semantics set $[[\neg \varphi]]$. Note that φ is the universal modal µ-calculus expression that is the specification. Also, $[[\ ]]$ is double brackets.

Further, the calculating unit 131 calculates the input values, the output values, and the states in the process of calculation of the recursive neural network as a set, by constrained zonotope. The calculating unit 131 expresses the semantics set by constrained zonotope and performs operation thereof. Thus, the calculating unit 131 can calculate the calculation process of the recursive neural network as abstractly interpreted results.

A constrained zonotope is defined as a common portion between a convex polytope and a solution set of a linear equation. A convex polytope is a polygon in two-dimensional space or a polyhedron in three-dimensional space that has been generalized in higher-dimensional space.

The calculating unit 131 takes advantage of the constrained zonotope being closed regarding operations of addition, linear transformation, common portions, actions of bounded and monotonous functions, and finding solution sets of linear equations. Note however, that the calculating unit 131 expresses a union by holding a plurality of constrained zonotopes.

The determining unit 132 determines whether or not the recursive neural network that is the object of checking satisfies the specification, on the basis of the set and the initial state of the recursive neural network that is the object of checking. For example, in a case in which the initial state is not included in the semantics set, the determining unit 132 determines that the neural network that is the object of checking satisfies the specification, and in a case in which the initial state is included in the semantics set, the determining unit 132 determines that the neural network that is the object of checking does not satisfy the specification. As described above, the semantics set $[[\neg \varphi]]$ is negation of the specification, and accordingly the initial state of the recursive neural network not being included in the semantics set can be said to mean that this recursive neural network satisfies the specification.

In a case in which the determining unit 132 determines that the recursive neural network that is the object of checking does not satisfy the specification, the generating unit 133 generates an input sequence that causes determination to be made that the specification is not satisfied, by backpropagation regarding the recursive neural network that is the object of checking. For example, in a case in which determination is made that the specification is not satisfied, the generating unit 133 can generate a counterexample by finding an input sequence using the process of calculating the semantics set, so that the state at each time is included in each stage of the process thereof, by backpropagation.

The calculation process of the semantics set by the calculating unit 131 includes fixed point calculation. Here, the generating unit 133 first uses the calculation process of the semantics set by the fixed point calculation expressed in Expression (1) to design a loss function so that the state at each time t will be included in the state in Expression (2). For example, the calculating unit 131 uses a hinge function (absolute value function) relating to distance from the set as a loss function.

[Math 1]

$$\{[\![\neg \varphi]\!]_{(t)}\}_{t=1}^{T} \quad (1)$$

[Math 2]

$$[\![\neg \varphi]\!]_{(T-t)} \quad (2)$$

As described above, the semantics set $[[\neg \varphi]]$ is negation of the specification, and accordingly, if each state corresponding to the input sequence is included in the semantics set, the input sequence is an input sequence that does not satisfy the specification, i.e., is a counterexample.

Figure 3:
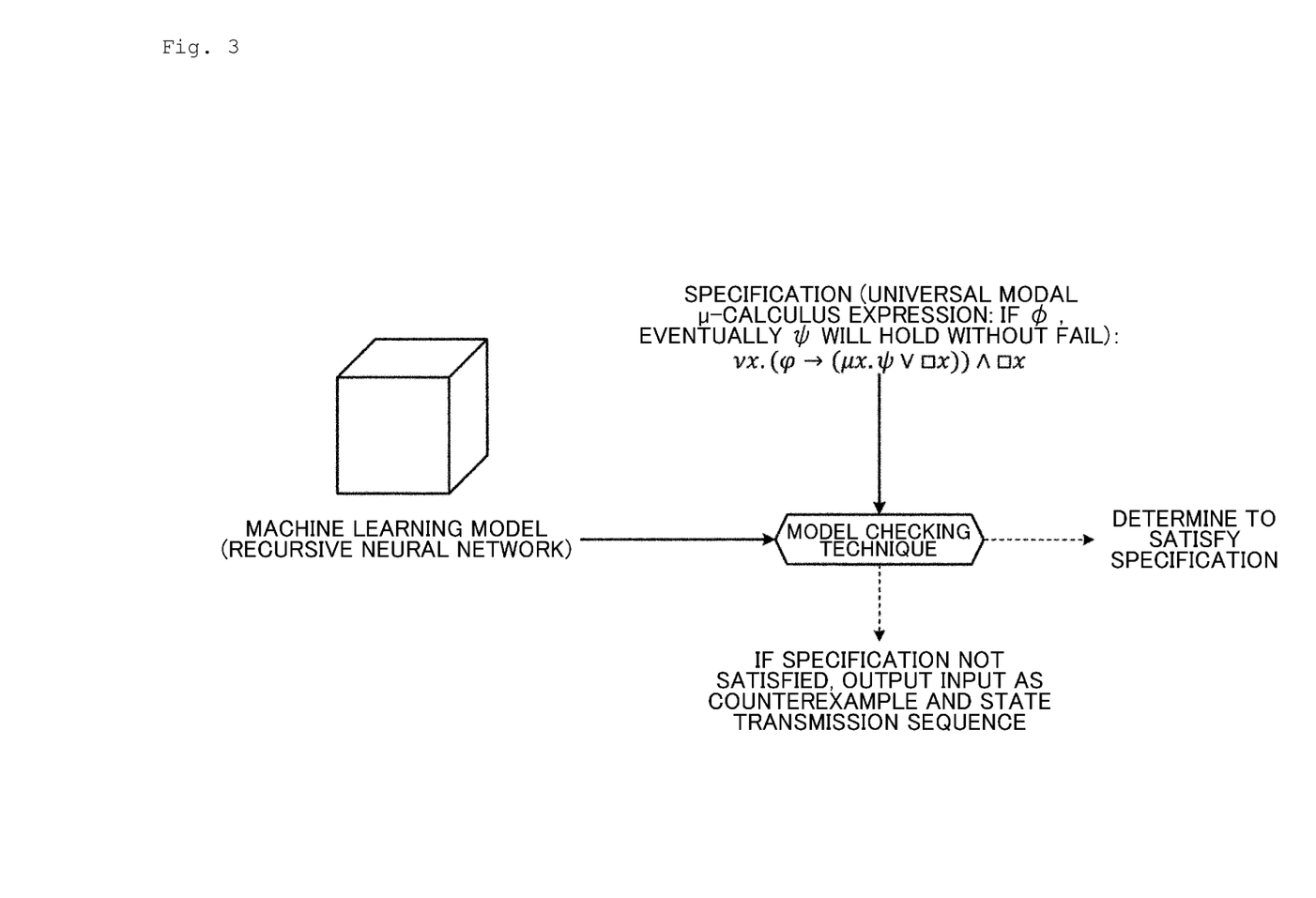
FIG. 3 is a diagram illustrating an overview of a checking method according to the first embodiment.

FIG. 3 is a diagram illustrating an overview of the checking method according to the first embodiment. The model checking technique in FIG. 3 is a calculation and determination technique carried out by the calculating unit 131, the determining unit 132, and the generating unit 133. As illustrated in FIG. 3, a machine learning model is input to the model checking technique. The machine learning model may be nonlinear. In the present embodiment, a recursive neural network is input.

Next, the model checking technique determines whether or not the machine learning model satisfies the specification. The specification is represented by the universal modal p-calculus expression. The universal modal μ-calculus expression represents that "if the specification is φ, this means that eventually Ψ will hold without fail", for example. Also, in a case in which the specification is not satisfied, the model checking technique generates and outputs input as a counterexample and a state transition sequence.

Figure 4:
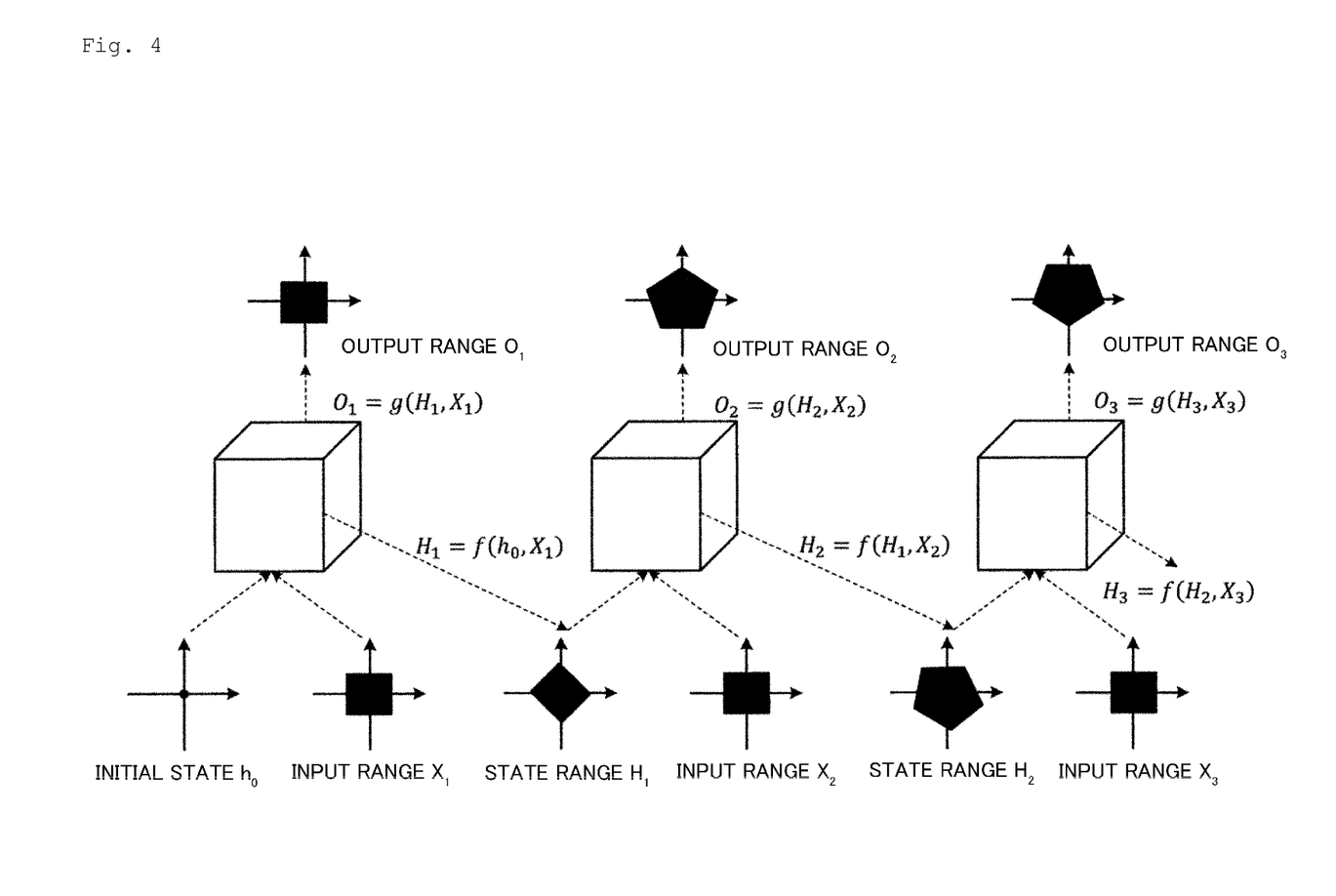
FIG. 4 is an explanatory diagram describing operations of a recursive neural network in a case of expressing values as a set.

FIG. 4 is an explanatory diagram describing operations of a recursive neural network in a case of expressing values as a set. The states of the recursive neural network, input values, and output values are expressed as ranges on a predetermined plane in the present embodiment. That is to say, the calculating unit 131 can track values that the states, input values, and output values can assume, as sets, by approximation of the calculation process. Also, the recursive neural network is expressed by functions f and g.

For example, the recursive neural network first, from an initial state $h_0$ and input range $X_1$, calculates state range $H_1=f(h_0, X_1)$ at time t=1. Further, the recursive neural network calculates, from state range $H_1$ and input range $X_1$, output range $O_1=f(H_1, X_1)$ at time t=1. Further, the recursive neural network calculates, from state range $H_1$ and input range $X_2$, state range $H_2=f(H_1, X_2)$ at time t=2. Further, the recursive neural network calculates, from state range $H_2$ and input range $X_2$, output range $O_2=f(H_2, X_2)$ at time t=2. Thus, the recursive neural network recursively calculates states and outputs.

Processing of First Embodiment

Figure 5:
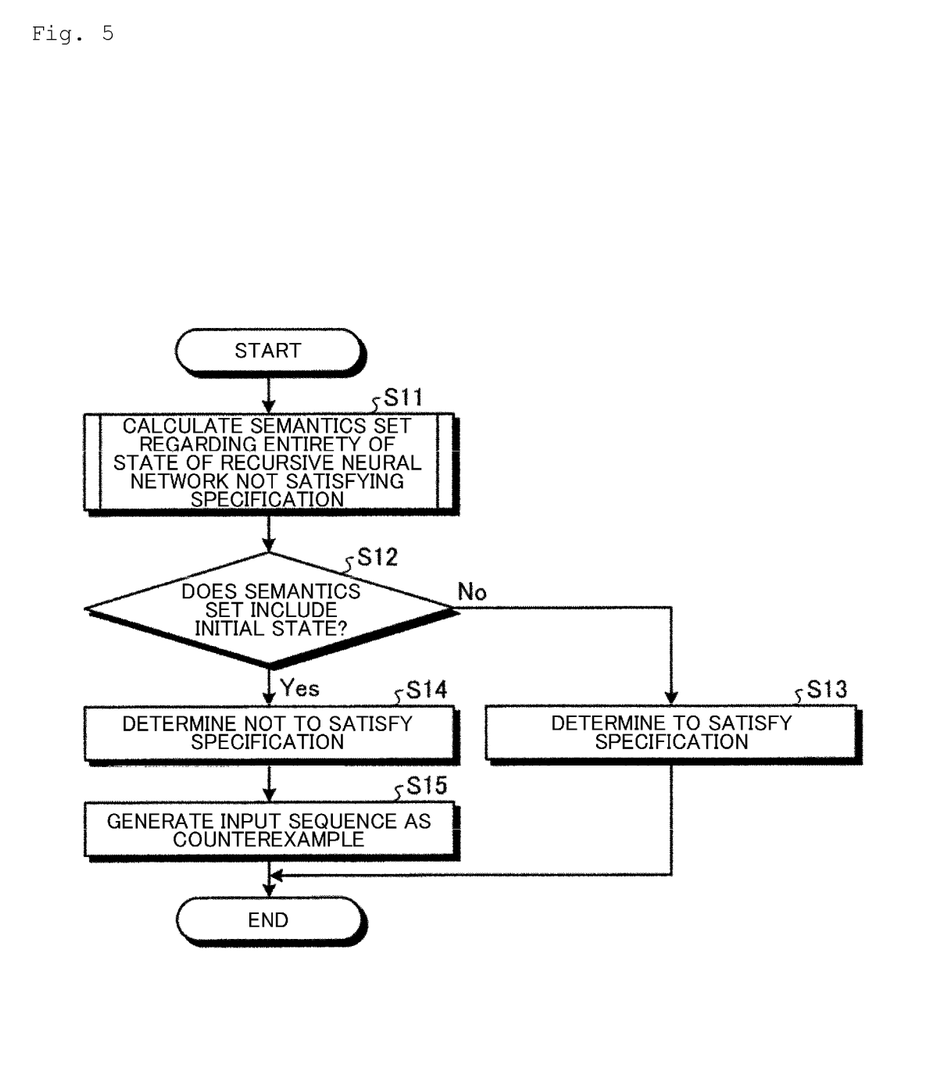
FIG. 5 is a flowchart showing a flow of processing of the checking device according to the first embodiment.

The flow of processing of the checking device 10 will be described with reference to FIG. 5. FIG. 5 is a flowchart showing a flow of processing of the checking device according to the first embodiment. First, the checking device 10 calculates a semantics set regarding the entirety of state of the recursive neural network that does not satisfy the specification (step S11). This means the checking device 10 calculating a semantics set negating the entirety of state of the neural network that satisfies the specification, for example.

Here, the checking device 10 determines whether or not the calculated semantics set includes the initial state of the neural network that is the object of checking (step S12). In a case in which the semantics set does not include the initial state (step S12, No), the checking device 10 determines that the neural network that is the object of checking satisfies the specification (step S13).

Conversely, in a case in which the semantics set includes the initial state (step S12, Yes), the checking device 10 determines that the neural network that is the object of checking does not satisfy the specification (step S14). Further, in a case of determining that the specification is not satisfied, the checking device 10 generates an input sequence that is a counterexample (step S15).

Figure 6:
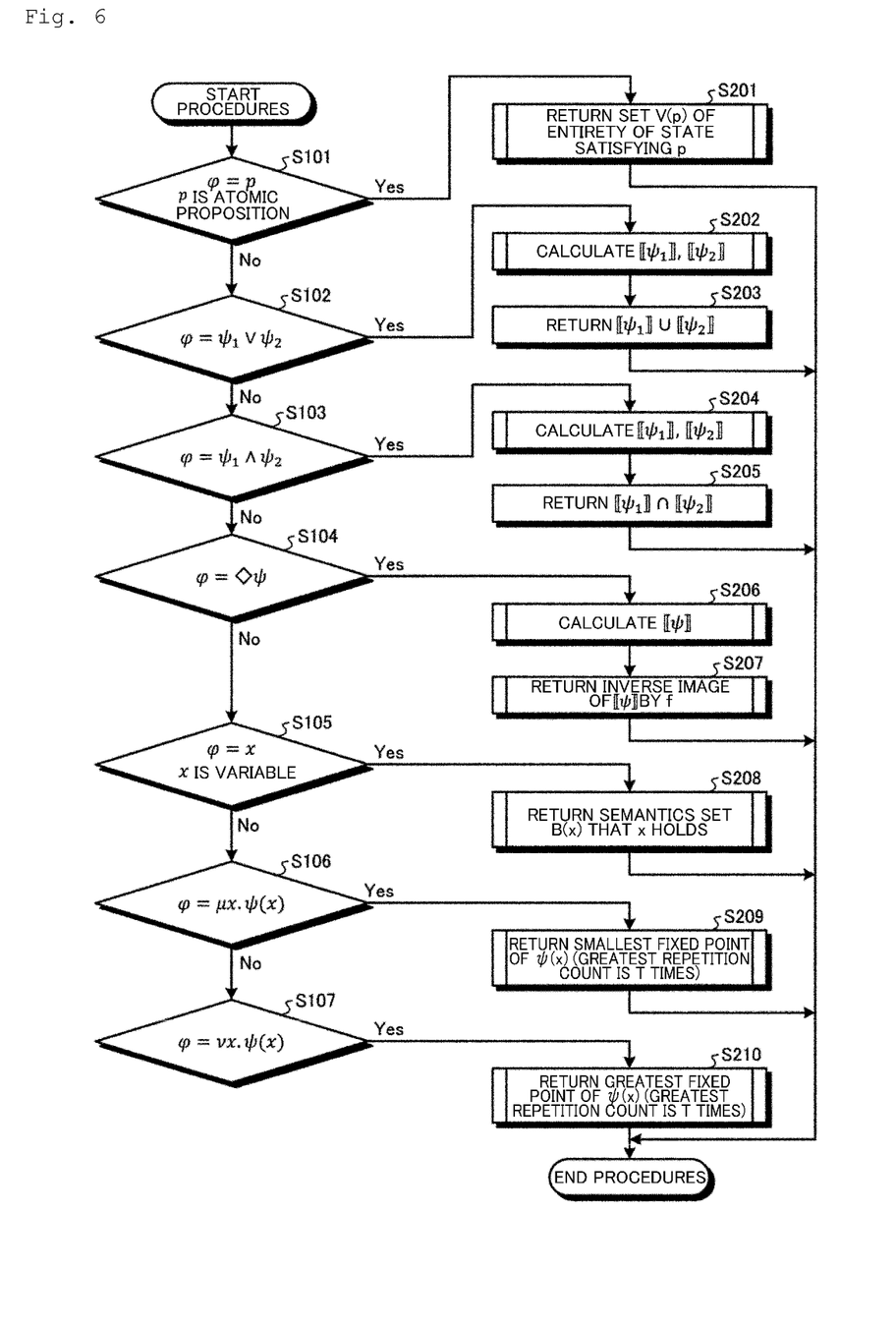
FIG. 6 is a flowchart showing a flow of processing for calculating a semantics set.

The flow of the processing of the calculating unit 131 of the checking device 10 calculating the semantics set (step S11 in FIG. 5) will be described with reference to FIG. 6. FIG. 6 is a flowchart showing the flow of processing for calculating the semantics set. Here, the neural network that is the object of checking is set as (f,g). The specification is expressed by the modal p-calculus expression φ. Also, a parameter representing the greatest value of the fixed point calculation count is T. Also, for example, [[φ]] represents a semantics set of φ. Ψ, $Ψ_1$, and $Ψ_2$ are optional modal μ-calculus expressions. Also, ◊ is an operator that means possible in modal logic.

First, in a case in which φ=p (step S101, Yes), i.e., in a case in which φ is an atomic proposition, the calculating unit 131 returns a set V(p) that of the entirety of state satisfying the atomic proposition p (step S201).

In a case in which φ=p does not hold (step S101, No), and φ=$Ψ_1$∨$Ψ_2$ holds (step S102, Yes), the calculating unit 131 calculates [[$Ψ_1$]] and [[$Ψ_2$]] (step S202), and returns [[$Ψ_1$]] ∪[[$Ψ_2$]] (step S203).

In a case in which φ=$Ψ_1$∨$Ψ_2$ does not hold (step S102, No), and φ=$Ψ_1$∧$Ψ_2$ holds (step S103, Yes), the calculating unit 131 calculates [[$Ψ_1$]] and [[$Ψ_2$]] (step S204), and returns [[$Ψ_1$]] ∩[[$Ψ_2$]] (step S205).

In a case in which φ=$Ψ_1$∧$Ψ_2$ does not hold (step S103, No), and φ=◊Ψ holds (step S104, Yes), the calculating unit 131 calculates [[Ψ]] (step S206), and returns an inverse image of [[Ψ]] by f (step S207).

In a case in which φ=◊Ψ does not hold (step S104, No), and φ=x, i.e., in a case in which φ is a variable (step S105, Yes), the calculating unit 131 returns a semantics set B(x) that x holds (step S208).

In a case in which φ=x does not hold (step S105, No), and φ=μx.Ψ(x) holds (step S106, Yes), the calculating unit 131 returns a smallest fixed point μx.Ψ(x) of Ψ(x) (step S209). The greatest repetition count here is T.

In a case in which φ=μx. Ψ(x) does not hold (step S106, No), and φ=νx.Ψ(x) holds (step S107, Yes), the calculating unit 131 returns a greatest fixed point νx. Ψ(x) of Ψ(x) (step S210). The greatest repetition count here is T.

Now, the flow of processing by the calculating unit 131 will be described by an example of φ=μx.p∨◊x. p is an atomic proposition. φ=μx.p∨◊x means that an input sequence exists regarding a certain recursive neural network, and that p will hold in a state at a certain time in the future.

The calculating unit 131 performs the following processing. Note however, that recursive callup means to recursively execute the flow in FIG. 6 from S101.

(1) First, with φ=μx. Ψ(x), the calculating unit 131 advances from step S106 to step S209, initializes B(x) to an empty set to calculate the smallest fixed point of Ψ(x)=p∨◊x, and recursive callup:
(1-1) With φ=$Ψ_1$∨$Ψ_2$, $Ψ_1$=p, $Ψ_2$=◊x are set and recursive callup:
(1-1-1) Since p is an atomic proposition, the flow advances from step S101 to S201, and returns V(p)
(1-1-2) With φ=◊Ψ, Ψ=x is set and recursive callup:
(1-1-2-1) Since x is a variable, the flow advances from step S105 to S208, and returns B(x)
(1-1-3) Inverse image of B(x) by f is returned
(1-2) return union of results returned in (1-1-1) and results returned in (1-1-3)
(2) Substitute results returned in (1-2) into x (i.e., set as value of B(x)), and repeat (1) by greatest count T.

Note however, that in step S209, B(x) is initialized to an empty set. Also, in step S210, B(x) is initialized to a set of the entirety of state that the recursive neural network represented by the constrained zonotope can assume.

Effects of First Embodiment

As described above, the calculating unit 131 calculates sets relating to the entirety of state of the recursive neural network satisfying a specification. The determining unit 132 determines whether or not the recursive neural network that is the object of checking satisfies the specification, on the basis of the set and the initial state of the recursive neural network that is the object of checking. In this way, the checking device 10 can check whether or not the recursive neural network satisfies the specification, using the nature of sets. Thus, according to the present embodiment, behavior of a system control by a recursive neural network that is a nonlinear function can be checked. Further, according to the present embodiment, a specification in which certain periods in which a particular function can be satisfied and certain periods in which the function must not be satisfied alternate, can be checked as well.

Further, according to the present embodiment, it is anticipated that a robot arm or autonomous driving car controlled by a recursive neural network can be guaranteed in advance not to perform undesirable actions that would be harmful. Also, the present embodiment can also be applied to trained recursive neural networks, and safety can be verified regarding systems already in use.

The calculating unit 131 calculates a semantics set for negation of the entirety of state of the recursive neural network satisfying the specification. In a case in which the initial state is not included in the semantics set, the determining unit 132 determines that the neural network that is the object of checking satisfies the specification, and in a case in which the initial state is included in the semantics set, determines that the neural network that is the object of checking does not satisfy the specification. In this way, the checking device 10 according to the present embodiment can easily check whether or not the recursive neural network satisfies the specification, using the nature of semantics sets.

The calculating unit 131 calculates a semantics set with the specification as a universal modal p-calculus expression. This guarantees that if a counterexample of the specification exists, there is only one.

The calculating unit 131 calculates the input values, the output values, and the states in the process of calculation of the recursive neural network as a set, by constrained zonotope. Also, as described above, the constrained zonotope is closed regarding operations of finding solution sets of linear equations. Accordingly, the calculating unit 131 can efficiently obtain the inverse image of the recursive neural network that is necessary for calculating a semantics set, without solving an inverse matrix. Note that an inverse image means back calculation of the calculation process of the recursive neural network.

In a case in which the determining unit 132 determines that the recursive neural network that is the object of checking does not satisfy the specification, the generating unit 133 generates an input sequence that causes determination to be made that the specification is not satisfied, by backpropagation regarding the recursive neural network that is the object of checking. Thus, in a case in which the recursive neural network does not satisfy the specification, a counterexample can be derived, and accordingly a specific attack example regarding a system vulnerability can be derived, for example.

System Configuration, Etc.

The components of the devices illustrated in the figures are functional concepts, and do not necessarily need to be physically configured in the same way as illustrated in the figures. That is to say, specific forms of distribution and integration of the devices are not limited to those illustrated in the figures, and all or part thereof can be configured being functionally or physically distributed or integrated in optional increments, in accordance with various types of loads, usage states, and so forth. Further, all or an optional part of the processing functions carried out at the devices may be realized by a CPU and a program analyzed and executed by the CPU, or alternatively may be realized as hardware through wired logic.

Also, out of the processes described in the present embodiment, all or part of processes described as being automatically performed can be manually performed. Alternatively, all or part of processes described as being manually performed can be automatically performed by known methods. Moreover, processing procedures, control procedures, specific names, and information including various types of data and parameters, in the above description and the figures, can be optionally changed unless specifically stated otherwise.

Program

As one embodiment, the checking device 10 can be implemented by installing a checking program that executes the above checking processing in a desire computer as packaged software or online software. For example, an information processing device can be caused to function as the checking device 10 by causing the information processing device to execute the above checking program. An information processing device as used here includes desktop and laptop personal computers. Additionally, mobile communication terminals such as smartphones, cellular telephones, PHSs (Personal Handyphone System), and so forth, and further, slate terminal and the like, such as PDAs (Personal Digital Assistant) and so forth, are included in the scope of information processing devices.

Also, the checking device 10 can be implemented as a checking server device that has a terminal device used by a user as a client, and provides services regarding the above checking processing to the client. For example, a checking server device is implemented as a server device that provides a checking service in which recursive neural networks are input and determination results or counterexamples are output. In this case, the checking server device may be implemented as a Web server, or may be implemented as a cloud that provides services regarding the above checking processing by outsourcing.

Figure 7:
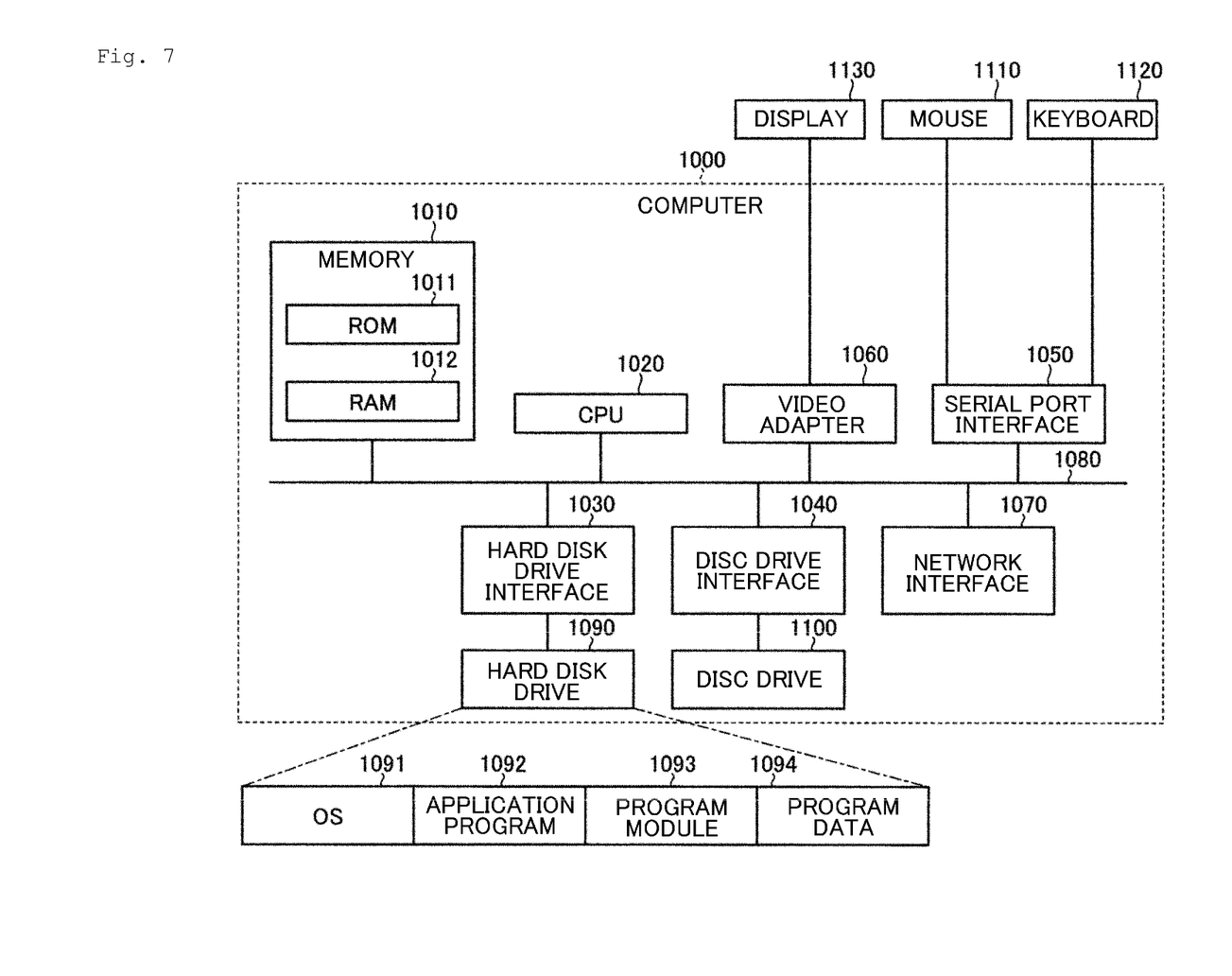
FIG. 7 is a diagram illustrating an example of a computer that executes a checking program.

FIG. 7 is a diagram illustrating an example of a computer that executes a checking program. A computer 1000 has memory 1010 and a CPU 1020, for example. The computer 1000 also has a hard disk drive interface 1030, a disc drive interface 1040, a serial port interface 1050, a video adapter 1060, and a network interface 1070. These parts are connected by a bus 1080.

The memory 1010 includes ROM (Read Only Memory) 1011 and RAM 1012. The ROM 1011 stores a boot program such as a BIOS (BASIC Input Output System) or the like, for example. The hard disk drive interface 1030 is connected to a hard disk drive 1090. The disc drive interface 1040 is connected to a disc drive 1100. A detachable storage medium such as a magnetic disk or an optical disc or the like, for example, is inserted to the disc drive 1100. The serial port interface 1050 is connected to, for example, a mouse 1110 and a keyboard 1120. The video adapter 1060 is connected to a display 1130, for example.

The hard disk drive 1090 stores, for example, an OS 1091, an application program 1092, a program module 1093, and program data 1094. That is to say, a program that defines each processing of the checking device 10 is implemented as the program module 1093 in which code that is executable by the computer is described. The program module 1093 is stored in the hard disk drive 1090, for example. The program module 1093 for executing processing the same as the functional configurations of the checking device 10, for example, is stored in the hard disk drive 1090. Note that the hard disk drive 1090 may be substituted by an SSD.

Also, settings data used in processing in the above-described embodiment is stored in the memory 1010 or the hard disk drive 1090, for example, as the program data 1094. The CPU 1020 then reads out the program module 1093 and the program data 1094 stored in the memory 1010 or the hard disk drive 1090 to the RAM 1012 as necessary, and executes the processing of the above-described embodiment.

Note that the program module 1093 and the program data 1094 are not limited to a case of being stored in the hard disk drive 1090, and may be stored in a detachable storage medium for example, and be read out by the CPU 1020 via the disk drive 1100 or the like. Alternatively, the program module 1093 and the program data 1094 may be stored in another computer connected via a network (LAN (Local Area Network), WAN (Wide Area Network), or the like). The program module 1093 and the program data 1094 may then be read out from the other computer by the CPU 1020 via the network interface 1070.

REFERENCE SIGNS LIST

10 Checking device
11 Input/output unit
12 Storage unit
13 Control unit
121 Model information
131 Calculating unit
132 Determining unit
133 Generating unit

The invention claimed is:

1. A checking device, comprising: a memory; and a processor coupled to the memory and programmed to execute a process comprising:
creating a set of state information, wherein each piece of state information describes a state of a recursive neural network, and the set of state information collectively describes respective semantic states of a plurality of semantic states of the recursive neural network based on satisfying a predetermined condition;
suppressing, based on the created set of state information and an initial state of the recursive neural network as input, processing of the recursive neural network when a semantic state in the created set of state information of the recursive neural network is checked and determined as violating the predetermined condition, thereby preventing movement of a part of an automated object to avoid executing a harmful action to a user by the automated object, wherein the recursive neural network generates a piece of state information to cause movement of the part of the automated object.

2. The checking device according to claim 1,
wherein the calculating calculates a semantics set for negation of the respective semantic states of the plurality of semantic states of the recursive neural network satisfying the specification,
and wherein, in a case in which the initial state is not included in the semantics set, the determining determines that the neural network that is the object of checking satisfies the specification, and in a case in which the initial state is included in the semantics set, determines that the neural network that is the object of checking does not satisfy the specification.

3. The checking device according to claim 2,
wherein the calculating calculates the semantics set with the specification as a universal modal µ-calculus expression.

4. The checking device according to claim 1,
wherein the calculating calculates input values, output values, and states in the process of calculation of the recursive neural network as a set, by constrained zonotope.

5. The checking device according to claim 1, further comprising:
when the recursive neural network is checked and determined as violating the predetermined condition, generating, based on a backpropagation operation comprising backpropagating based on a piece of state information of the created set of state information to the recursive neural network, an input sequence as a result of the backpropagation operation, wherein the input sequence satisfies the predetermined condition.

6. A checking method executed by a checking device, the method comprising:
creating a set of state information, wherein each piece of state information describes a state of a recursive network, and the set of state information collectively describes respective semantic states of a plurality of semantic states of the recursive neural network based on satisfying a predetermined condition:
suppressing, based on the created set of state information and an initial state of the recursive neural network as input, processing of the recursive neural network when a semantic state in the created set of state information of the recursive neural network is checked and determined as violating the predetermined condition, thereby preventing movement of a part of an automated object to avoid executing a harmful action to a user by the automated object, wherein the recursive neural network generates a piece of state information to cause movement of the part of the automated object.

7. A non-transitory computer-readable recording medium having stored therein a program, for checking, that causes a computer to execute operations comprising:
creating a set of state information, wherein each piece of state information describes a state of a recursive neural network, and the set of state information collectively describes respective semantic states of a plurality of semantic states of the recursive neural network based on satisfying a predetermined condition;
suppressing, based on the created set of state information and an initial state of the recursive neural network as input, processing of the recursive neural network when a semantic state in the created set of state information of the recursive neural network is checked and determined as violating the predetermined condition, thereby preventing movement of a part of an automated object to avoid executing a harm to a user by the automated object, wherein the recursive neural network generates a piece of state information to cause movement of the part of the automated object.

* * * * *